Feb. 1, 1966 S. W. SINCLAIR ETAL 3,232,452
METHOD OF AND APPARATUS FOR STACKING COILS
Filed Dec. 20, 1963 7 Sheets-Sheet 2
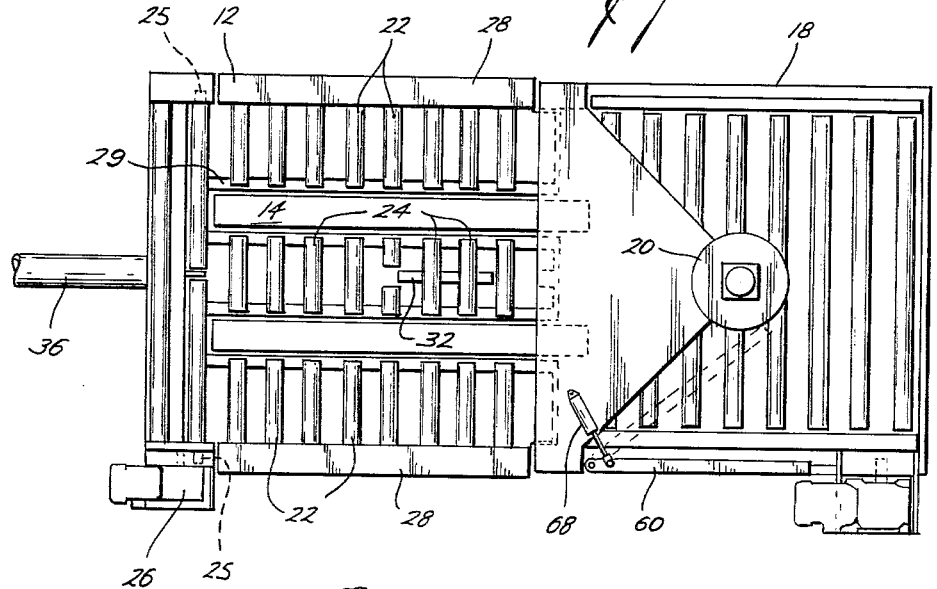
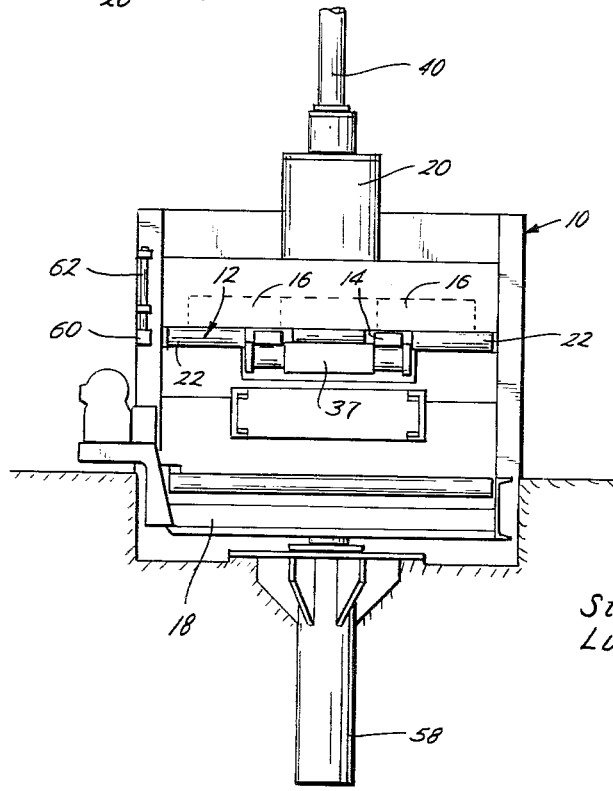
Stuart W. Sinclair
Luther F. Ezzell
INVENTORS
BY
ATTORNEYS

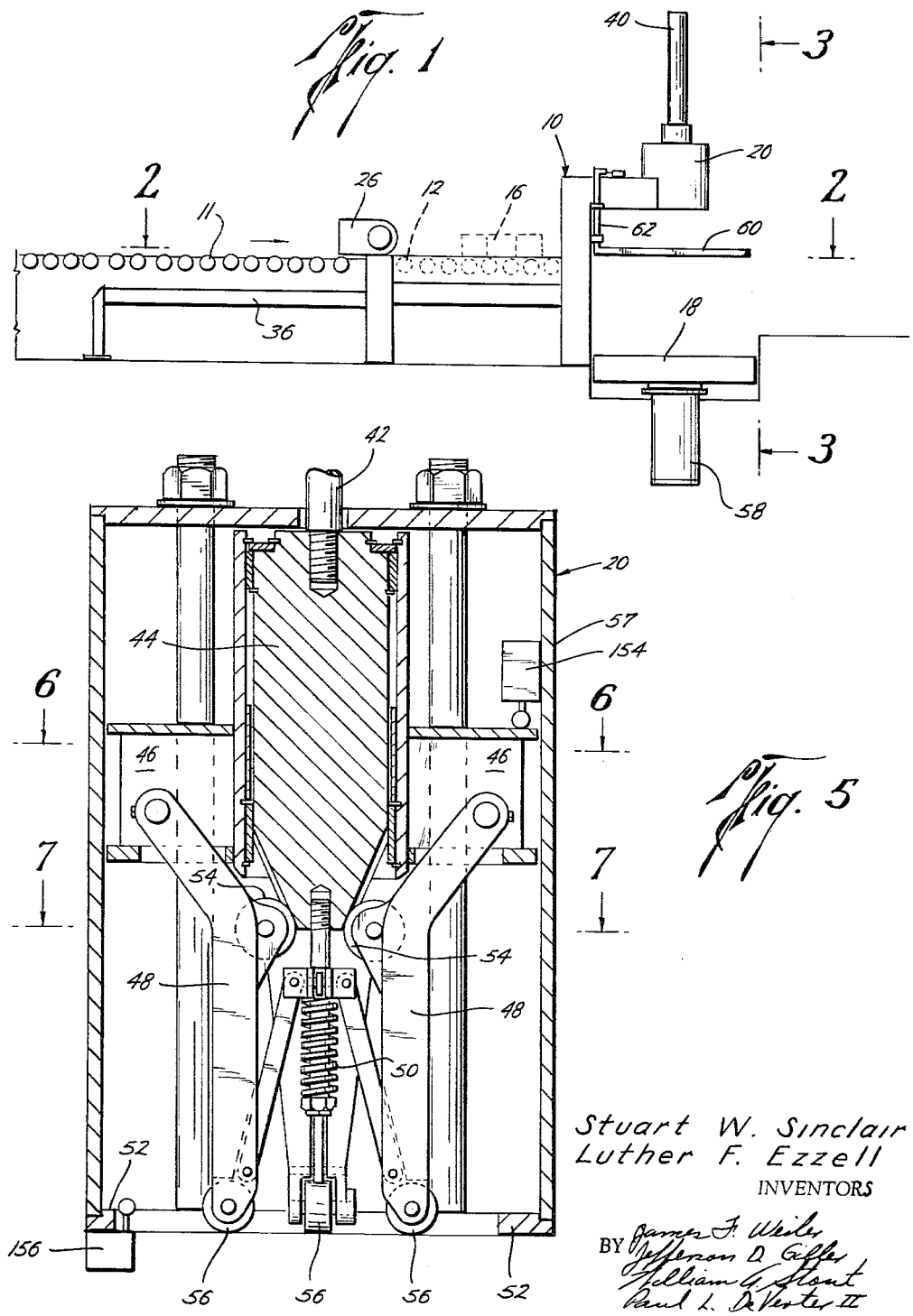

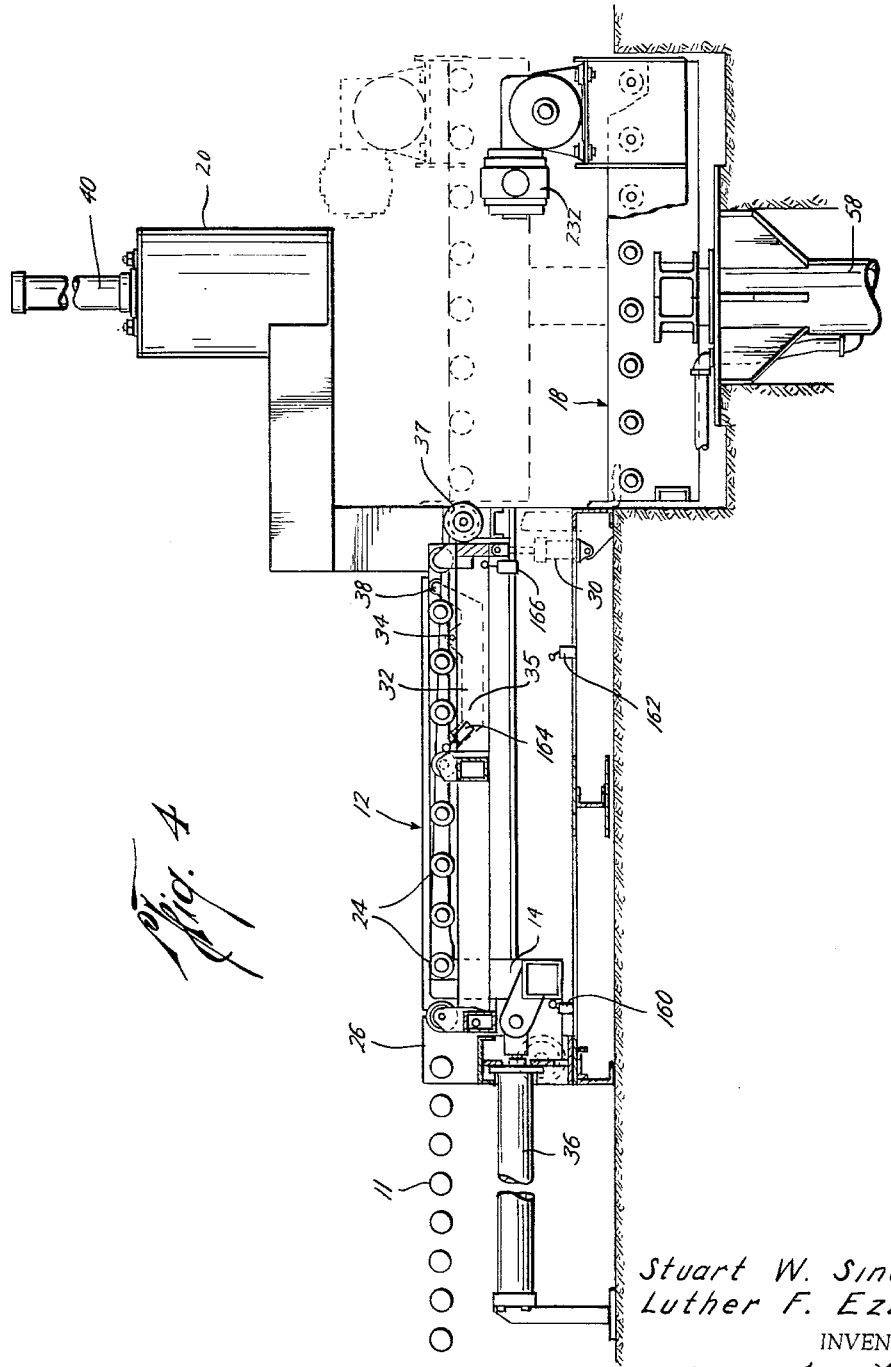

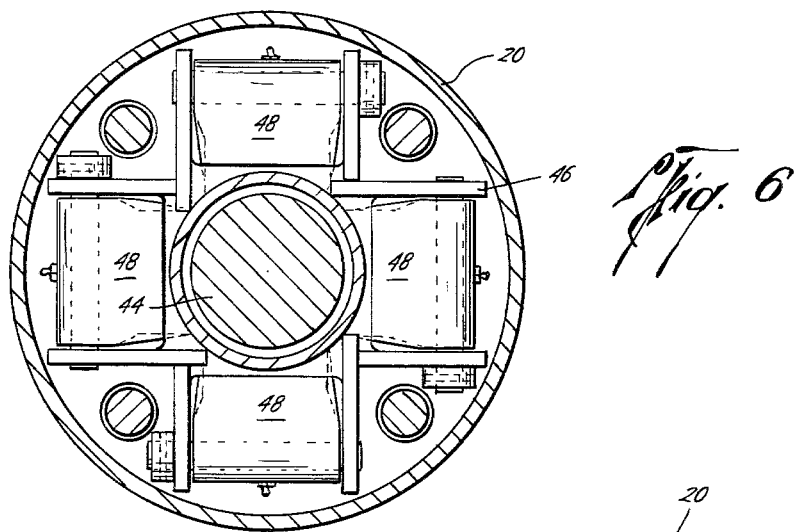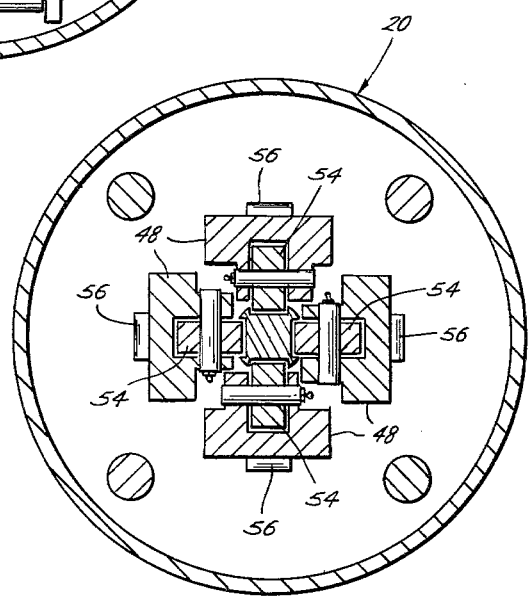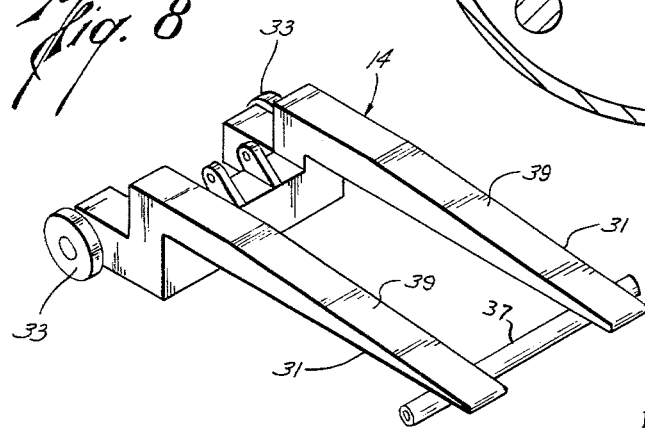

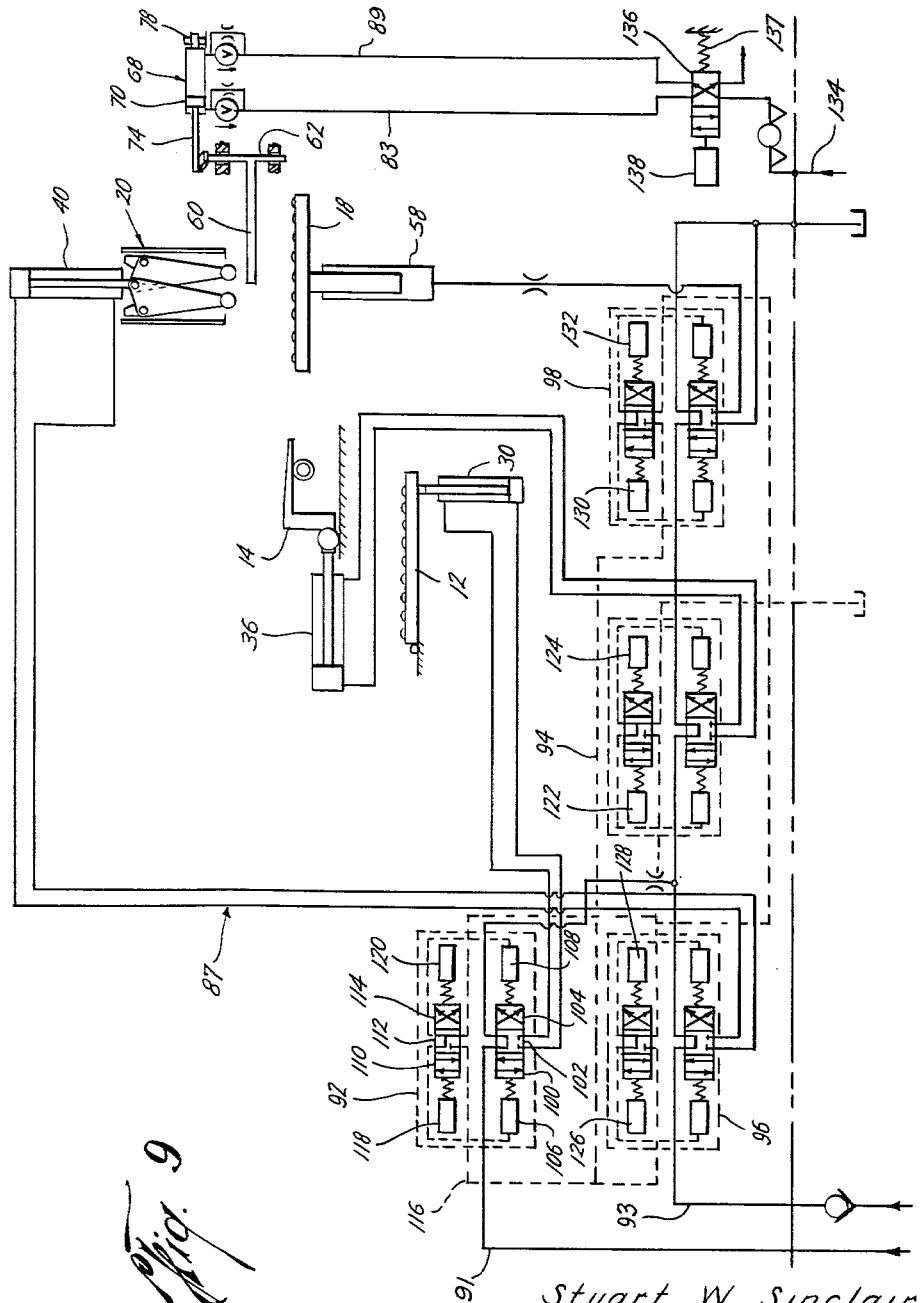

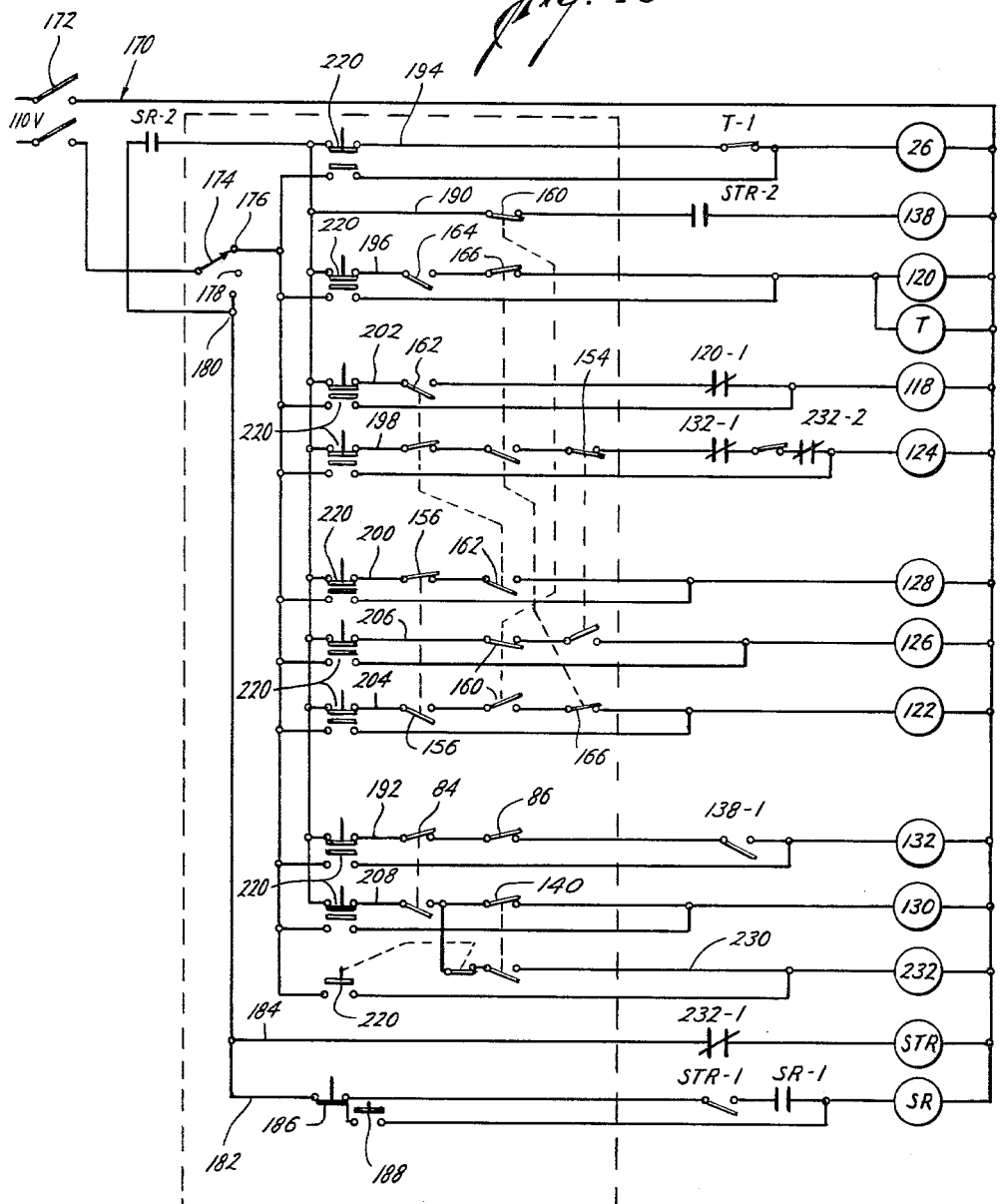

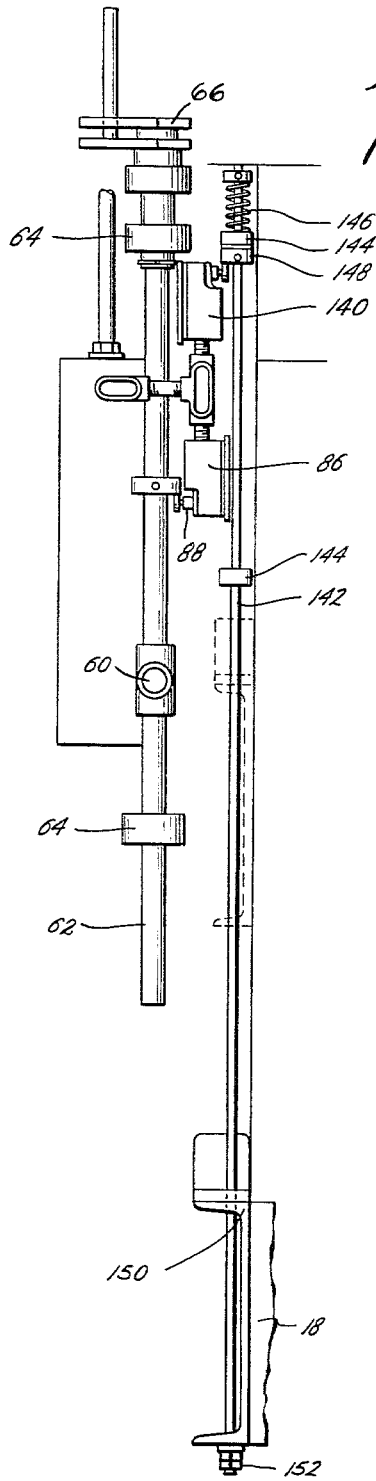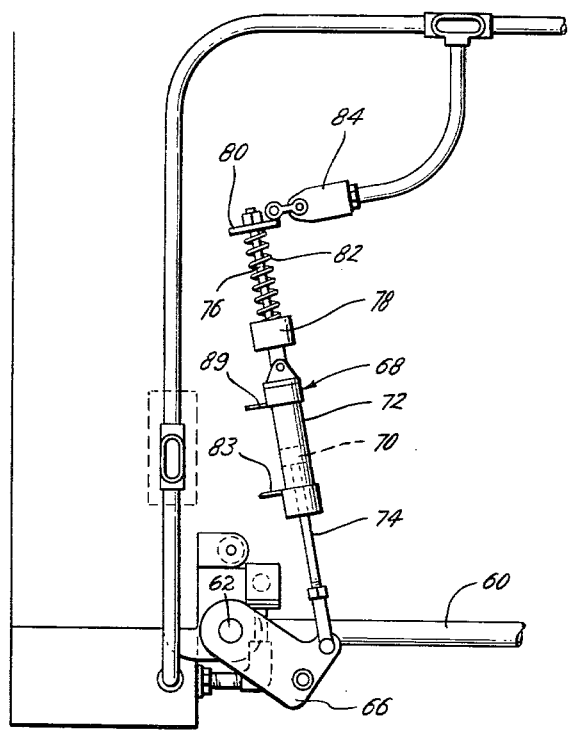

United States Patent Office 3,232,452
Patented Feb. 1, 1966

3,232,452
METHOD OF AND APPARATUS FOR
STACKING COILS
Stuart W. Sinclair and Luther F. Ezzell, Houston, Tex.,
assignors to Anderson, Clayton & Co., Houston, Tex.,
a corporation of Delaware
Filed Dec. 20, 1963, Ser. No. 332,181
14 Claims. (Cl. 214—6)

The present invention relates to a method of and an apparatus for stacking a plurality of metal coils, and more particularly relates to a stacking apparatus and method which receives a succession of horizontal moving metal coils, such as from a conveyor, and transfers them into a vertical stack.

Sheet metal material is normally produced in rolls varying in weight from approximately 5,000 to 50,000 pounds or more. In the past a great deal of difficulty has been experienced in handling the rolled sheet material because of its weight. The present invention is directed to an improvement in a method of and an apparatus for stacking metal coils. Normally, coils are made by slitting, coiling and then banding the individual coils. In order to readily handle the banded metal coils, they are generally vertically stacked one on top of the other on a skid or pallet which then can be conveniently picked up for storage or shipping. The present invention is directed to various improvements in a coil stacker, and more particularly in a fork-type coil stacker whereby a fork provides the transferring mechanism from a conveyor to a platform and supports the entire width of the coil thus preventing damage, band breakage, or telescoping of the coil.

It is therefore a general object of the present invention to provide a method of and an apparatus for providing and actuating a fork-type coil stacker that will transfer coils from a conveyor and stack them vertically on a suitable platform.

A further object of the present invention is the provision of a method of and an apparatus for stacking coils which will automatically receive a plurality of metal coils and transfer them to an aligned vertical stack suitable for convenient storage or shipping.

It is still a further object of the present invention to provide a fork-type coil stacker which will transfer coils from a conveyor and position them in a vertical stack wherein a roller support is provided adjacent the outer end of the fork to prevent any springing action as the fork discharges the coil thereby avoiding marring of the coils by the fork.

A still further object of the present invention is the provision of a fork-type stacking apparatus which includes a conveyor for receiving the metal coils, a fork positioned in recesses in the conveyor so that on vertical movement of one of the fork and conveyor the fork will support the coil and move it horizontally over a platform whereby a vertically movable coil engaging mechanism will engage and align the coil in a horizontal position over the platform so as to deposit the coil in vertical alignment on the platform when the fork is retracted.

Still a further object of the present invention is the provision of a fork-type coil stacker wherein a fork positioned in recesses in a conveyor receives a coil and transfers it horizontally over a platform which is vertically movable so that the top of the platform or any coils stacked thereon may be positioned only slightly under the horizontally moving fork so that the next coil will be conveniently deposited on the platform and any coils stacked thereon without damaging the coils.

Still a further object of the present invention is the provision of an apparatus for and a method of stacking a plurality of horizontally moving metal coils onto a platform by means of a coil stacker wherein one of the coils is horizontally moved into position over the fork to a predetermined location, vertically moving a support into a horizontal plane slightly under said fork and longitudinally aligned with the fork, longitudinally extending the fork to position said coil over the support, and horizontally aligning and holding said coil while the fork is being retracted to position the coil on the support.

A still further object of the present invention is the provision of a method of and an apparatus for stacking a plurality of horizontally moving coils by a fork onto a support which includes vertically lowering the discharge support so that the top of the support or any coils stacked thereon is positioned in a horizontal plane slightly under the fork when the fork is in an extended position whereby the next coil can be positioned on top of and aligned with the vertical axis of the discharge support.

Yet a further object of the present invention is the provision of a method of and an apparatus for vertically stacking a plurality of horizontally positioned coils onto a platform by a fork which includes a conveyor having fork recesses and a longitudinally movable fork positioned in said recesses, means on the conveyor for positioning oncoming coils at a predetermined location over said recesses and fork, means for lowering the conveyor thereby depositing the coil on the fork, means for longitudinally extending the fork to move the coil over the platform which has been vertically positioned slightly under the extended fork, coil centering and engaging means for gripping and aligning the coil over the platform for deposit thereon when the fork is retracted and means for vertically positioning the platform for receiving the vertically stacked coils.

Other and further objects, features and advantages will be apparent from the following description of a presently preferred embodiment of the invention given for the purpose of disclosure and taken in conjunction with the accompanying drawings, where like character references designate like parts throughout the several views and where, FIGURE 1 is a side elevational view of an apparatus showing the present invention, FIGURE 2 is an enlarged cross-sectional view taken along the line 2—2 of FIGURE 1, FIGURE 3 is an enlarged cross-sectional view taken along the line 3—3 of FIGURE 1, FIGURE 4 is an enlarged elevational cross-sectional view of the present invention, FIGURE 5 is an enlarged elevational cross-sectional view of the coil centering and engaging apparatus, FIGURE 6 is a cross-sectional view taken along the line 6—6 of FIGURE 5, FIGURE 7 is a cross-sectional view taken along the line 7—7 of FIGURE 5, FIGURE 8 is a perspective view of the fork of the present invention, FIGURE 9 is a schematic diagram of the hydraulic and pneumatic power circuits for actuation of the various mechanisms of the present invention, FIGURE 10 is an electrical schematic of the electrical control system of the present invention, FIGURE 11 is an enlarged fragmentary top elevational view of the sensing arm mechanism, and FIGURE 12 is an enlarged fragmentary side elevational view of the sensing arm mechanism.

Referring now to the drawings and particularly to FIGURES 1, 2, 3 4 and 8, the coil stacker apparatus of the present invention, generally referred to by the numeral 10, is best seen. Generally, the apparatus 10 of the present invention is positioned at the end of a conveyor 11 which forms no part of the present invention but which may transport incoming banded coils for delivery to the apparatus 10. The apparatus 10 generally includes a stacker conveyor 12, a fork stacker 14 recessed in the conveyor 12 for receiving and transferring a coil 16 after the conveyor 12 has centered and stopped the coil 16 over the fork 14. A platform 18 is included which is vertically movable for positioning in a horizontal plane slightly under the fork 14 to receive the coil 16 when the fork is extended over the platform 18, and a coil engaging and centering mechanism 20 is provided above the platform 18 which is vertically movable to engage a coil 16 when the fork is extended thereby aligning the coil 16 for placement on the platform 18 when the fork is retracted.

Referring now to FIGURES 1, 2 and 4, a stacker conveyor 12 is best seen as including a plurality of powered rollers 22 along the outer edges of the conveyor 12 and a plurality of idler rollers 24 along the middle of the conveyor 12.

Suitable drive means such as an electric motor 26 is provided to rotate the powered rollers 22 and stop them at the appropriate time. The motor 26 may control the rotation of the powered rollers 22 by any conventional means such as a chain drive (not shown). Side rails 28 are provided along each side of the conveyor 12 to contain and center to some extent the coils placed thereon. It is to be noted that longitudinal recesses 29 are provided on each side of the idler rollers 24 for a purpose which will be more fully discussed hereinafter. The first end of the conveyor 12, which is remote from the platform 18 is pivotally supported at point 25 (FIGURE 2). The second end of the conveyor is supported by power means such as a piston and cylinder assembly 30, shown in FIGURE 4 as supporting the stacker conveyor 12 in an upward position. Referring particularly to FIGURES 2 and 4 a pivoted lever 32 is shown pivoted about an eccentric point 34 whereby the weight of the lever normally keeps lever end 35 retracted and lever end 38 in an upward position. Thus, as a coil passes over the lever 32 the coil contacts end 38 and pushes it downwardly. The lever end 35 will then be raised and is sized to be projected into the center of a coil 16 thereby stopping the coil at a predetermined location on the conveyor 12.

Referring now to FIGURES 2, 3, 4, 8 and 9, the longitudinally movable fork 14 is best seen. The supporting prongs 31 are normally positioned in the recesses 29 of the conveyor 12. However, when the conveyor 12 is in its up position, due to the action of the piston and cylinder assembly 30, the top surface of the fork 14 will be below the rollers 22 and 24. However, when the conveyor 12 is lowered by the piston and cylinder assembly 30, a coil 16 which has been positioned and centered on the conveyor 12 will then be deposited on the fork 14 at a predetermined location thereon due to the action of lever 32. Referring specifically to FIGURES 4 and 8, it is to be noted that the fork 14 is supported at one end by rollers 33 which are supported on longitudinal tracks (not shown) for longitudinal movement toward the platform 18. Suitable power means such as a hydraulic piston and cylinder assembly 36 is connected to the fork 14 to provide the force for extending and retracting the fork 14 over the platform 18 so as to transfer a coil 16 from the fork 14 to the discharge support 18. Preferably, the top surfaces 39 of the prongs 31 are tapered towards their outer end to aid in retracting the fork 14. Referring now specifically to FIGURES 3, 4 and 8, a support roller 37 is provided near the tips of the prongs 31 to support them as nearly as possible in a horizontal position at all times to minimize deflection of the tips of the prongs 31 adjacent the roller 37. Thus, since the roller 37 will be positioned adjacent the discharged support 18 the deflection of the tips of the prongs 31 will be at a minimum. Therefore the springing action of the prong tips as they are retracted from the coil 16 will be minimized so as to prevent damage to the coil by springing prong tips when the weight of the coil is slid off the fork 14.

Referring now to FIGURES 5, 6 and 7, the details of construction and operation of the coil centering and engaging mechanism 20 is best seen. The purpose of the centering and engaging mechanism 20 is to move downwardly when the fork 14 is extended to engage the center opening of the metal coil 16 so as to horizontally center the coil 16 for proper alignment for transfer to the discharge platform 18, and to hold the coil 16 in that position as the fork 14 is retracted. Thus, a suitable power means such as piston and cylinder assembly 40 (FIGURES 1, 3, 4 and 9) is provided to extend and retract a piston rod 42 to move the centering and engaging mechanism downwardly into the center opening of a coil 16. An expander member 44 is connected to the piston rod 42 for vertical movement. Slidably connected to and supported by the expander 44 are a plurality of support members 46 each of which pivotally supports an expanding lever 48. Thus as the piston rod 42 and expander 44 move downwardly, the supports 46 and the levers 48 also move downwardly into the center of a coil. The expanding levers 48 are normally held in a retracted position by having their free ends held inwardly by a retracting spring 50. However, when the assembly moves downwardly the supports 46 will contact shoulders 52 thereby preventing further downward movement of the supports 46 and expanding levers 48. Thus, further downward movement of the expander 44 will act against the rollers 54 on the back side of each of the expanding levers 48 causing the lower ends of the levers to move outwardly, and thus causing the engaging rollers 56 to expand inside the coil opening and engage the coil 16. This action centers and horizontally holds the coil 16 in an aligned position on the vertical axis of the centering and expanding mechanism 20 so that the fork 14 may be retracted and the metal coils may be deposited on the discharge support 18. The centering and engaging means 20 may then be retracted wherein the expander 44 will withdraw allowing the spring 50 to retract the engaging rollers 56 and levers 48 and as the expander 44 moves upwardly it will again carry the slidable supports 46 and the engaging levers 48 into the housing 57 of the centering and engaging mechanism 20 and out of the way in preparation for the next coil.

Of course, it is desirable that the top of discharge platform 18 or any coils thereon be vertically positioned just beneath the extended forks 14 prior to the retraction of the fork for receiving the coil while the centering mechanism 20 aligns the coil for deposit on the platform 18. Thus, a suitable power means such as piston and cylinder assembly 58 is provided for raising and lowering the discharge platform 18. However, after one or more coils 16 have been deposited and stacked on the platform 18 the platform 18 is then vertically positioned so that the top of the stack of coils is positioned slightly below the extended fork to receive the next coil for stacking. Therefore, it is desirable to position the discharge platform 18 in a vertical position depending upon the number and height of any coils stacked thereon.

Referring now to FIGURES 1–4 and 11 and 12, the operation of a sensing arm 60 for controlling the vertical position of the discharge platform 18 is best seen. The sensing arm 60 is mounted for both vertical and horizontal movement and is secured to arm shaft 62. Shaft 62 is suitably mounted by supports 64 (FIGURE 12) for rotational and vertical movement. Referring specifically to FIGURE 11, a lever 66 is connected to the rotatable shaft 62 and is connected to a suitable power means such as a pneumatic cylinder and piston assembly 68 having a piston 70 movable in the cylinder 72 and a piston rod 74 connecting the piston 70 with the lever 66. The cylinder 72 is connected to an actuating shaft 76 which is slidable through a fixed support 78. An actuating shoulder 80 is connected to the other end of the shaft 76 and is yieldably urged outwardly by a spring 82 which also causes the cylinder 72 to be yieldably urged against the fixed support 78. Thus, as air is admitted to the cylinder 70 through a control line 83 the cylinder 70 will remain stationary because of the action of the spring 82 thereby causing the piston 70, and piston rod 74 to rotate the lever 66 causing the sensing arm 60 to move inwardly towards the vertical axis of the discharge platform 18.

It is to be noted that normally the actuation shoulder 80 contacts and actuates a limit switch 84, which is connected in an electrical circuit which will be more fully described hereinafter for controlling the positioning of the discharge platform 18. Thus, as the sensing arm 60 moves over the platform 18, if it does not contact the platform 18 or a coil 16 already stacked thereon, there will be no change in the position of the limit switch 84 and the sensing arm 60 will thus note the fact that the platform 18 and any coils thereon is positioned beneath the sensing arm 60. If, however, the sensing arm, on the inward movement, contacts the platform 18 or a coil thereon this will indicate that the platform 18 must move downwardly. As the sensing arm 60 will thus on such contact be unable to move inwardly any further the movement of the piston rod 74 and piston 70 is stopped which will in turn cause the cylinder 72 to move relative to the piston 70. Movement of the cylinder 72 overcomes the spring 82 thereby retracting the actuating shoulder 80 thereby tripping the limit switch 84 to actuate downward movement of platform 18 as will be more fully described hereinafter.

However, it is desired that the top of the platform 18 or any coils stacked thereon be vertically positioned slightly under the horizontal plane of the fork 14. Therefore, assuming that the sensing arm 60 is now rotated and positioned over the platform 18 and any coils thereon, a control circuit causes the upward movement of the platform 18 until the platform or any coils thereon contacts the underside of the sensing arm 60. As best seen in FIGURE 12 any further upward movement of the platform and any coils thereon upwardly will vertically move the sensing arm 60 and arm shaft 62 upwardly to cause actuation of a limit switch 86 by a detent 88. As will be more fully explained hereinafter when limit switch 86 is actuated, the upward movement of the platform 18 is stopped at its desired vertical position for receiving and stacking the next oncoming coil. Air line 89 (FIGURES 9 and 11) will then supply air to the cylinder 72 to rotate the sensing arm 60 to its normal position and out of the way as it has then served its function of automatically controlling the vertical position of the platform 18 and any coils stacked thereon.

Referring now to FIGURE 9, the hydraulic and pneumatic control and power circuit for actuating the various power means is best seen. Generally, the hydraulic system is referred to by the numeral 87 and includes parallel hydraulic supply lines 91 and 93. A separate three position hydraulic valve is provided for the hydraulic piston and cylinder assembly 30 which controls the raising and lowering of conveyor 12, for the hydraulic piston and cylinder assembly 36 which controls the longitudinal extension and retraction of fork 14, for the hydraulic piston and cylinder assembly 40 which controls the extension and retraction of the centering and engaging mechanism 20, and for the hydraulic piston and cylinder assembly 58 for raising and lowering the discharged platform 18. Thus, valve 92 controls the actuation of hydraulic fluid to the piston and cylinder assembly 30, valve 94 controls the flow of fluid to and from piston and cylinder assembly 36, valve 96 controls the flow of fluid to and from piston and cylinder assembly 40 and valve 98 controls the flow of fluid to and from cylinder and piston assembly 58. Each of the hydraulic control valves are identical and include an electrically actuated hydraulic pilot valve which in turn hydraulically actuates the three positioned main hydraulic control valves. For simplicity of explanation only a single valve will be described in detail. Thus, valve 92 has a main control three-positioned valve having positions 100, 102, and 104. As shown, the valve 92 is in position 102 which is the off position with no hydraulic fluid being passed to cylinder and piston assembly 30. The three-positioned valve is controlled by hydraulic cylinders 106 and 108 which shift the main control valve from one control position to another control position. Assuming hydraulic valve 106 is actuated, the valve will be placed in operating position 100, thus the hydraulic flow passes into the supply lines to the hydraulic piston and cylinder assembly 30 in a direction to raise the conveyor 12. On the other hand, if the hydraulic valve 108 is actuated the valve will be placed in position 104 to reverse the flow of hydraulic fluid to the piston and cylinder assembly 30 thereby lowering the conveyor 12. The pilot valve section of valve 92 also includes a hydraulic three-positioned pilot valve for supplying hydraulic fluid to the hydraulic control cylinders 106 and 108 of the main control valve and which has positions 110, 112 and 114. Dotted line 116 indicates the hydraulic pilot line inlet to the three-positioned pilot valve wherein when the pilot valve is in position 112 no hydraulic fluid passes to either of the cylinder assemblies 106 and 108. However, when the pilot valve is in position 110 hydraulic fluid is passed to and actuates cylinder assembly 106 and when the pilot valve is in position 114 hydraulic fluid is passed to and actuates cylinder assembly 108. The action of the pilot valve of valve 92 is controlled by electric solenoids 118 and 120 which therefore actuate the hydraulic flow and in turn control the raising and lowering of the conveyor 12. Similarly, electric solenoids 122 and 124 in hydraulic valve 94 control the actuation of the fork 14, electric solenoids 126 and 128 in hydraulic valve 96 control the actuation of the centering and engaging mechanism 20 and solenoids 130 and 132 in hydraulic valve 98 control the actuation and positioning of the discharge conveyor 18. The control and actuation of the electric solenoids will be more fully described in connection with the operation of the electrical control system.

A pneumatic supply line 134, as best seen in FIGURE 9, provides the two-way actuation of the piston and cylinder assembly 68 which controls the rotation of the sensing arm 60. A two-way control valve 136 is provided which is in turn controlled by electric solenoid 138 and spring 137.

In order to provide a semi-automatic operation of the apparatus 10 suitable limit control switches are provided to actuate and control the operation of the various power means in their proper sequence. The operation and actuation of limit switches 84 and 86, as shown in FIGURES 11 and 12, have previously been described. Again referring to FIGURE 12, limit switch 140 is shown which is controlled by the vertical movements of the conveyor platform 18. Thus, a vertically movable shaft 142 is slidably supported through supports 144 and normally held in an up position by spring 146. An actuating shoulder 148 is thus normally held out of contact and actuation of limit switch 140. The shaft 142 passes at its lower end through an actuating bracket 150 which is carried by the platform 18. Thus, when the platform 18 and bracket 150 reach a predetermined lower position the bracket contacts nut 152 pulling the shaft 142 downwardly and moving the actuating shoulder 148 into contact with and actuating limit switch 140.

Referring to FIGURE 5, limit switches 154 and 156 are seen which are actuated by the centering and engaging mechanism 20 at its outer limits of travel, both of retraction and extension. And referring to FIGURE 4, limit switches 160 and 162 are provided which are actuated at the extreme limits of travel of fork 14. Limit switch 164 is attached to and moved by the lever 32 into engagement with the center of a coil and thereby is an indication of the engagement or predetermined longitudinal position of a coil 16 on the conveyor 12. And limit switch 166 is provided which is tripped on lowering of the conveyor 12.

Referring now to FIGURE 10, the electrical control circuit 170 and its operation is best seen. A suitable power switch 172 connects the control circuit 170 to a suitable electrical source. A main control switch 174 is provided which can be selectively switched to a manual control position 176, an off position 178, or a semi-automatic position 180. Assuming that the control switch is in the semi-automatic position, electrical power will be passed to start and stop circuit 182 and 184, respectively. Power is applied to the start circuit through the normal stop button 186 and to the start push button 188, which when actuated energizes start relay SR. This locks to the start relay contacts SR-1 and SR-2. Since a stop timing relay STR is also energized in the stop circuit 184 the contact STR-1 in the start circuit 182 is closed thereby now interlocking the start relay SR in.

The closing of contact SR-2 provides power to the remainder of the control circuits and provides automatic sequencing of the operation of the apparatus 10. Thus, power is transmitted to sensing arm circuit 190 which is actuated since limit switch 160 (FIGURE 4) will be actuated since the fork 14 is in a retracted position against the limit switch 160. Also, since stop relay STR has been energized the contact STR-2 will also be energized closing the sensing arm circuit 190 and energizing relay 138 (FIGURE 9) in a direction to cause the sensing arm 60 to rotate towards the vertical axis of the discharge platform 18. Assuming that the sensing arm 60 does not contact the discharge platform 18 or any stacked coils thereon, discharge elevator up circuit 192 is now energized as limit switch 84 remains closed, limit switch 86 (FIGURE 12) is also closed and contact 138-1 is now closed because of the previous actuation of relay 138. This causes the actuation of solenoid relay 132 (FIGURE 9) to provide hydraulic fluid to raise the discharge conveyor 18 until it contacts the bottom side of the sensing arm 60 thereby actuating limit switch 86 (FIGURE 12) opening solenoid relay 132 to stop further upward movement of discharge platform 18.

During this time stacker conveyor motor circuit 194 is also energized through the normally closed timing contact T-1 whereby conveyor motor 26 (FIGURES 1, 2 and 3) rotate the conveyor 12 to move an incoming coil onto the conveyor 12. When the coil travels over lever 32 (FIGURE 4) and actuates the lever to stop the coil over the fork 14, limit switch 164 is energized to simultaneously actuate the timing relay T which in turn opens contact T-1 to stop stacker conveyor motor 26, and simultaneously to actuate solenoid relay 120 (FIGURE 9) to actuate hydraulic valve 92 to lower conveyor 12. Timer contact T-1 opens after a short time delay so that the power rollers 22 will rotate and center the coil about the lever 32 thereby centering the coil on the fork 14. The conveyor bed 12 then drops tripping limit switch 166 (FIGURE 4). Tripping of switch 166 opens the conveyor bed down circuit 196 and closes the contact in the fork extending circuit 198. Since limit switch 154 is actuated because the centering head is in the upward position (FIGURE 5) solenoid relay 124 will be actuated to longitudinally extend the fork 14 to move the coil now placed thereon over the discharge platform 18.

The fork 14 will then extend actuating limit switch 160 and limit switch 162. Actuating limit switch 160 will open and reset circuit 190, reset circuit 206 for operation, and reset circuit 204. Tripping limit switch 162 de-energizes relay coil 124 stopping the fork 14, and in centering head down circuit 200 actuates relay solenoid 128 causing the centering and engaging head 20 to move downwardly, and also energizes conveyor bed up circuit 202 thereby energizing relay solenoid 118 to raise the conveyor 12 to its original up position. The centering and engaging head 20 will move downwardly to engage the coil opening and actuates limit switch 154 (FIGURE 5) which resets circuits 198 and 206. When it reaches its downward extent of travel the head 20 will contact and trip limit switch 156 which de-energizes circuit 200 and stops further downward movement of the centering head 20 and simultaneously energizes fork retraction circuit 204 to energize solenoid relay 122 (FIGURE 9) causing the fork 14 to retract again actuating limit switches 162 and 160 (FIGURE 4) to energize centering head up circuit 206 thereby energizing solenoid relay 126 causing the centering head to return to its up position which again actuates limit switch 154. Also, the actuation of limit switch 160 again energizes solenoid 138 causing the sensing arm 60 to move inwardly. However, the sensing arm 60 will now contact the coil now stacked and aligned on the platform 18, and referring to FIGURE 11, the cylinder 72 will move against the spring 82 actuating limit switch 84 which energizes discharge platform downcircuit 208 and energizing relay solenoid 130 thereby lowering the discharge platform 18 until the sensing arm 60 is free thereby again tripping limit switch 84 to de-energize solenoid relay 130.

In the event the discharge platform 18 is lowered a sufficient distance to actuate limit switch 140 (FIGURE 12) this indicates that the platform is full and should be emptied. Therefore, actuation of switch 140 energizes discharge motor circuit 230 and discharge motor 232 to power the rollers on platform 18 to move the skid or pallet and the vertically stacked metal coils out of the apparatus 10. Actuation of motor 232 opens contact 232-1 in circuit 184 and after a predetermined time delay opens the contact STR-1 to shut down the automatic operation.

Of course, the selector switch 174 may be put in position 176, as shown, for manual operation in which event the manual push buttons 220 in each of the actuation circuits could be individually and manually actuated in their desired sequence to provide a manually controlled operation of the control circuit 170.

In operation, and at the beginning of a normal complete cycle, the apparatus 10 of the present invention is in position as shown in FIGURES 1–5 with the fork 14 retracted and contacting limit switch 160 (FIGURE 4), the conveyor 12 in an up position and out of contact with limit switch 166, the coil positioning lever 32 (FIGURE 4) pivoted about pivot point 34 with the roller end 38 projecting above the conveyor 12 and the shoulder end 35 disposed below the top of the conveyor 12 by reason of the weight of the lever pivoting on the eccentric pivot point 34 and with limit switch 164 being out of contact with any coil. The centering and engaging mechanism 20 is in an up position and in contact with limit switch 154 (FIGURE 5). The discharge platform is in its lowermost position and though shaft 142 (FIGURE 12) actuates limit switch 140. The sensing arm 60 is swung out of the path of travel of the discharge conveyor but actuates limit switch 84 (FIGURE 11), but is not contacting limit switch 86 (FIGURE 12).

Therefore, for semi-automatic operation the selector switch 174 is placed in position 178 and the main power switch 172 is closed thereby providing power to the start circuit 182 and the stop timing circuit 184.

The energization of relay STR closes contacts STR-1 and STR-2, and the cycle is begun by pressing the start button 188 to energize start relay SR which closes contacts SR-1 and SR-2. Relay SR is interlocked into the circuit 182 and power is provided to the various individual control circuits.

Feeder conveyor 11 is started to feed a coil to the apparatus 10, electrical motor 26 (FIGURES 1 and 2) is actuated through stacker conveyor motor circuit 194 to rotate the power rollers 22 (FIGURE 2) to move a coil 16 onto conveyor 12 and sensing arm circuit 190 is energized to actuate solenoid relay 138 (FIGURE 9) to provide an air source to the cylinder and piston assembly 68 through air line 83 (FIGURES 9 and 11) to rotate the sensing arm 60 inwardly over the platform 18. Since the platform 18 is in a lowered position and no coils 16 have been stacked thereon, the sensing arm 60 will move inwardly without tripping limit switch 84. The actuation of the sensing arm relay 138 closes contact 138–1 and the discharge conveyor up circuit 192 thereby energizing the discharge platform relay 132 (FIGURE 9) to actuate the pilot valve and main hydraulic valve circuit 198 to provide hydraulic fluid to the piston and cylinder assembly 58 to raise the platform 18 until it contacts the bottom of the sensing arm 60 thereby raising the sensing arm and actuating limit switch 86 (FIGURES 10 and 12) which opens relay 132 stopping the upward movement of discharge platform 18.

During this time, the incoming coil has passed onto conveyor 12 and contacts end 38 of the lever 32 tripping the lever and raising lever end 35 to engage the center of the coil 16 causing forward movement of the coil 16 to stop and thus positions the coil 16 at a predetermined position over the fork 14. Limit switch 164 contacts the interior of the coil 16 and is actuated energizing conveyor down circuit 196 to energize relay solenoid 120 (FIGURES 9 and 10) to actuate the hydraulic control valve 92 in a direction to provide fluid to the piston and cylinder assembly 30 to lower the conveyor 12 thereby depositing the coil 16 on the fork 14 at a predetermined location. When the conveyor 12 reaches its lower position it contacts and actuates limit switch 166 thereby de-energizing relay 120 and stopping further downward movement of the conveyor 12. Simultaneous actuation of limit switch 166 energizes circuit 198 and fork extension relay 124 (FIGURES 9 and 10) to actuate the hydraulic control valve 94 in a direction to longitudinally extend fork 14 carrying the coil 16 to a position over the discharge platform 18. Movement of the fork 14 actuates limit switch 160 and at the end of its travel actuates limit switch 162. The actuation of limit switch 160 de-energizes solenoid relay 138 allowing the sensing arm 60 to be rotated away from the vertical axis of the platform 18 by the action of spring 137 which supplies air to line 89. The tripping of limit switch 162 energizes relay 118 (FIGURES 9 and 10) actuating hydraulic valve 92 to again raise the conveyor 12, de-energizes fork extension circuit 198 and fork extension relay 124 to stop further extension of the fork 14, and simultaneous energizes centering head down circuit 200 to energize relay solenoid 128 (FIGURES 9 and 10) to actuate the hydraulic control valve 96 in a direction to provide fluid to the piston and cylinder assembly 40 to move the piston rod 42 and expander member 44 (FIGURE 5) downwardly. This carries the engaging arms 48 and engaging rollers 56 downwardly into the center of the coil 16 and when the supports 46 contact the stop shoulders 52 further downward movement of the expander member 44 against the expanding rollers 54 will move the arms 48 and rollers 58 outwardly thereby engaging, centering and holding the coil 16 in an aligned position over the discharge platform 18.

Downward movements of the centering head engaging mechanism 20 will therefore actuate limit switches 154 and 156. The actuation of limit switch 154 resets the fork extension circuit 198 in preparation for the next cycle, and closes the contact 154 in the centering head up circuit 206, also in preparation for its actuation. The actuation of limit switch 156 de-energizes centering head down circuit 200 thereby stopping the downward movement of the centering and engaging head 20, and energizes fork retraction circuit 204 to energize solenoid relay 122 (FIGURES 9 and 10) to actuate hydraulic control valve 94 for retracting the fork 14. Retraction of the fork 14 again actuates limit switches 162 and 160 which energizes the centering head circuit 206 energizing solenoid relay 126, raises the centering engaging head upwardly, and resets circuits 198 and 206 for the next cycle. And as best seen in FIGURE 5, the retraction of the centering head 20 releases limit switch 156 and trips limit switch 154 to de-energize centering head up circuit 206 thereby stopping the centering and engaging mechanism 20 in its upward position, resets fork extension circuit 198, resets centering head down circuit 200, and resets fork retraction circuit 206 for the next cycle.

After a predetermined number of coils have been stacked vertically one on another on platform 18, the discharge platform is lowered on the next cycle by the action of the sensing arm 60 and the control circuit a distance sufficient to actuate limit switch 140 (FIGURES 10 and 12). This is an indication the platform is full and should be emptied. Therefore, actuation of switch 140 energizes discharge motor circuit 230 and discharge motor 232 to power the rollers on platform 18 to move the skid or pallet and the vertically stacked metal coils out of the apparatus 10.

It is believed that the method of the invention is apparent from the foregoing description of a presently preferred embodiment of the invention. The method, however, comprises the steps of stacking a plurality of horizontally moving metal coils onto a platform with a fork stacker by horizontally moving one of the coils into position over the fork, positioning said coil at a predetermined location on the fork, vertically moving a support into a horizontal plane slightly under the fork and longitudinally aligned with the fork, longitudinally extending the fork to position the coil over the support, and horizontally aligning and holding said coil while the fork is being retracted so as to position a coil on the support. The method further comprehends vertically lowering the platform until the top of the one coil is positioned in a horizontal plane slightly under the fork when the fork is in an extended position whereby the next coil can be stacked on top of and aligned with the coil.

The present invention, therefore, is well suited and adapted to carry out the objects and attain the ends and advantages mentioned as well as others inherent therein. While a presently preferred embodiment of the invention is given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. A stacking apparatus for receiving a succession of metal coils and stacking them one above the other comprising,
   a conveyor for receiving said metal coils, said conveyor having fork recesses,
   a fork normally positioned in said recesses,
   means for moving said fork longitudinally,
   means for vertically separating said conveyor and fork with the fork becoming positioned above the conveyor thereby transferring coils from the conveyor to said fork,
   a vertically movable discharge platform positioned on the longitudinal axis of said fork for receiving coils from the fork thereby stacking them on said platform,
   means for vertically positioning said platform to provide a support slightly under the fork for receiving the next successive coil, and
   vertically movable coil engaging means positioned above the discharge platform for engaging coil when the fork is longitudinally extended thereby aligning said coil for stacking on the platform.

2. The invention of claim 1 including,
   rotatable support means connected to the end of the fork remote from the discharge platform, and
   roller means positioned under said fork at the second end and adjacent said platform for supporting said second fork end.

3. The invention of claim 1 wherein the means for vertically positioning the platform includes,
a horizontally movable sensing arm positioned adjacent said platform,
means for horizontally rotating said sensing arm across the vertical path of travel of said platform, and
means connected to said sensing arm controlling the position of said platform.

4. The invention of claim 1 wherein the means for vertically separating the conveyor and the fork includes,
means adjacent the end of the conveyor remote from the discharge platform pivotally supporting said conveyor and,
means connected to the end of the conveyor adjacent said platform for lowering and raising said adjacent end.

5. The invention of claim 1 wherein the coil engaging means includes,
means movable downwardly into said coil opening, and
expandable means for expanding inside of the coil opening and holding said coil aligned in a horizontal position as the fork is retracted.

6. The invention of claim 1 including,
coil positioning means for positioning one of said coils in a predetermined position over said recesses.

7. The invention of claim 6 wherein said coil positioning means includes,
a lever having first and second ends,
said lever being eccentrically pivoted with said first end normally being positioned beneath the upper surface of the conveyor and nearer the upstream end of the conveyor relative to the second lever end,
said second lever end normally projecting above the upper surface of said conveyor whereby a coil will contact and depress the second lever end thereby pivoting the first lever end into the coil opening and positioning the coil on the conveyor.

8. The invention of claim 1 including,
roller means positioned under said fork at the end nearest said platform for supporting said fork end and preventing deflection of said end.

9. The invention of claim 1 wherein said coil engaging means includes,
an expansion member,
a plurality of engaging members, said engaging members slidably carried by said expansion member,
means normally holding said engaging members in a retracted position, and
means permitting but limiting the travel of said engaging means relative to said expansion member whereby the engaging members are carried into the coil opening and then expanded by the expansion member into engagement with the coil.

10. A stacking apparatus for receiving a succession of metal coils and stacking them one above the other on a platform comprising,
a conveyor for receiving said metal coils, said conveyor having fork recesses,
powered means for rotating said conveyor and coils thereon,
positioning means for stopping said conveyor and positioning one of said coils in a predetermined position over said recesses,
a fork normally positioned in said recesses,
means for vertically moving one of said fork and conveyor to deposit said one coil on said fork,
means for moving said fork longitudinally,
a vertically movable discharge platform positioned on the longitudinal axis of said fork for receiving coils from the fork,
means for vertically moving said support into a horizontal plane slightly under said fork, and
vertically movable coil engaging means positioned above the vertical axis of said platform for aligning and holding said coil while the fork is retracted thereby depositing said coil in a predetermined position on said support.

11. The invention of claim 10 including,
roller means positioned under said fork at the end nearest said platform for supporting said second fork end and preventing deflection of said end.

12. A stacking apparatus for receiving a succession of metal coils and stacking them one above the other on a platform comprising,
a conveyor for receiving said metal coils, said conveyor having fork recesses,
a fork having first and second ends and normally positioned in said recesses below the top of the conveyor,
positioning means for positioning one of said coils in a predetermined position over said recesses,
the first end of the fork being upstream of the second fork end relative to the conveyor and rollingly supported for longitudinal movement,
roller means supporting the second end of said fork,
means for moving said fork longitudinally,
means for lowering said conveyor thereby depositing any coil positioned over said recesses onto said fork,
a vertically movable discharge platform positioned on the longitudinal axis of said fork for receiving coils from the fork,
means for vertically moving said platform into a position relative to the fork when they are extended for receiving and stacking said coils on said platform,
vertically movable coil centering and engaging means positioned above the vertical axis of said platform for aligning and holding said coil while the fork is retracted thereby depositing said coil in an aligned position on said support.

13. A method of stacking a plurality of horizontally moving metal coils onto a platform with a fork stacker comprising,
horizontally moving one of said coils into position over said fork,
positioning said one coil at a predetermined location on said fork,
vertically moving a support into a horizontal plane slightly under said fork and longitudinally aligned with said fork,
longitudinally extending said fork to position said one coil over said support, and
horizontally aligning and holding said one coil while the fork is being retracted to position said coil on said support.

14. The invention of claim 13 including,
vertically lowering said platform until the top of said one coil is positioned in a horizontal plane slightly under the fork when the fork is in an extended position whereby the next coil can be positioned on top of and aligned with said one coil.

No references cited.

GERALD M. FORLENZA, *Primary Examiner.*